(12) United States Patent
Phillips et al.

(10) Patent No.: US 6,505,884 B2
(45) Date of Patent: Jan. 14, 2003

(54) LOWER FENDER EXTENSION BRACE

(76) Inventors: Geoffrey Lynn Phillips, 208 SE. 107th Ave., Vancouver, WA (US) 98664; Michael Dale Rhodes, 7406 NE. 87th Cir., Vancouver, WA (US) 98661

( * ) Notice: Subject to any disclaimer, the term of this patent is extended or adjusted under 35 U.S.C. 154(b) by 0 days.

(21) Appl. No.: 09/858,227

(22) Filed: May 15, 2001

(65) Prior Publication Data

US 2002/0000729 A1 Jan. 3, 2002

Related U.S. Application Data

(60) Provisional application No. 60/208,801, filed on Jun. 1, 2000.

(51) Int. Cl.[7] .............................. B60J 7/00; B62D 25/12
(52) U.S. Cl. ...................... 296/188; 296/194; 180/69.21
(58) Field of Search ................................ 296/188, 189, 296/194; 180/69.2, 69.21; 293/102, 117, 115

(56) References Cited

U.S. PATENT DOCUMENTS

| 3,583,756 | A | | 6/1971 | Wilfert |
| 3,917,332 | A | | 11/1975 | Puleo |
| 4,406,489 | A | | 9/1983 | Trabert |
| 5,645,133 | A | * | 7/1997 | Thompson et al. ...... 180/69.21 |
| 5,658,041 | A | | 8/1997 | Girardot et al. |
| 5,794,976 | A | | 8/1998 | Stevicks |
| 5,806,620 | A | * | 9/1998 | DeRees et al. .......... 180/62.21 |
| 6,216,810 | B1 | | 4/2001 | Nakai |

* cited by examiner

Primary Examiner—Joseph D. Pape
(74) Attorney, Agent, or Firm—Kurt M. Rylander

(57) ABSTRACT

A lower fender extension brace for mounting on truck hood fenders to prevent lower fender breakage and cracking. Lower fender extension brace comprises brace attachable to the inside of a hood fender of a truck or van to provide support to the front, corner, and side of said hood fender to reduce breaking and cracking in the hood fender. Lower fender extension brace that can be attached to the inside of a hood fender of a truck or van using rivets, nuts and bolts, molecular bonding, or high strength bonding tape.

7 Claims, 1 Drawing Sheet

LOWER FENDER EXTENSION BRACE

CROSS-REFERENCE TO RELATED APPLICATION

This application claims the benefit of priority from U.S. Provisional Patent Application Ser. No. 60/208,801, filed Jun. 1, 2000.

FIELD OF THE INVENTION

The present invention relates to truck fenders, and more specifically articles and methods for protecting truck and van hood fenders from breakage.

BACKGROUND

Trucks suffer from breakage of the truck fenders. Truck and van hood fenders, particularly those of the Utilimaster W-700 through W-900 series, suffer from cracking, and breakage. Existing articles and methods relating to hood fenders and apparatus attachable to trucks and vans do no address or resolve this problem.

The following represents a list of known related art:
U.S. Pat. No. 4,406,489, issued to Trabert, Sep. 27, 1983;
U.S. Pat. No. 6,216,810, issued to Nakai, Apr. 17, 2001;
U.S. Pat. No. 5,658,041, issued to Girardot, et al., Aug. 19, 1997;
U.S. Pat. No. 3,917,332, issued to Puleo, Nov. 4, 1974;
U.S. Pat. No. 5,794,976, issued to Stevicks, Aug. 18, 1998; and
U.S. Pat. No. 3,583,756, issued to Wilfert, Jun. 8, 1971.

The teachings of each of the above-listed citations (which does not itself incorporate essential material by reference) are herein incorporated by reference. None of the above inventions and patents, taken either singularly or in combination, is seen to describe the instant invention as claimed. Thus solving the aforementioned problems is desired.

OBJECTS AND ADVANTAGES

Accordingly, it is an object to provide novel articles and methods for solving the above-mentioned problems. In particular, it is an object to provide a lower fender extension brace for mounting on a truck body to prevent and reduce lower fender deformation and breakage. It is a further object of the invention to provide improved elements and arrangements thereof for the purposes described which is inexpensive, dependable and fully effective in accomplishing its intended purposes. These and other objects of the present invention will become readily apparent upon further review of the following specification and drawings.

The novel articles and methods provide a number of advantages. The novel articles and methods prevent and reduce lower fender deformation and breakage. The novel articles and methods are manufactured from readily available materials and can be employed with minimal labor hour costs in comparison to the savings made from reduced and prevented lower fender deformation and breakage.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

Potential customers for articles and methods that meet these objects include trucking and van companies, delivery services that utilize walk in vans and trucks, and many more.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy. An attempt has been made specifically to point out any dimensions, tolerances, etc., which are important.

Figure 1:
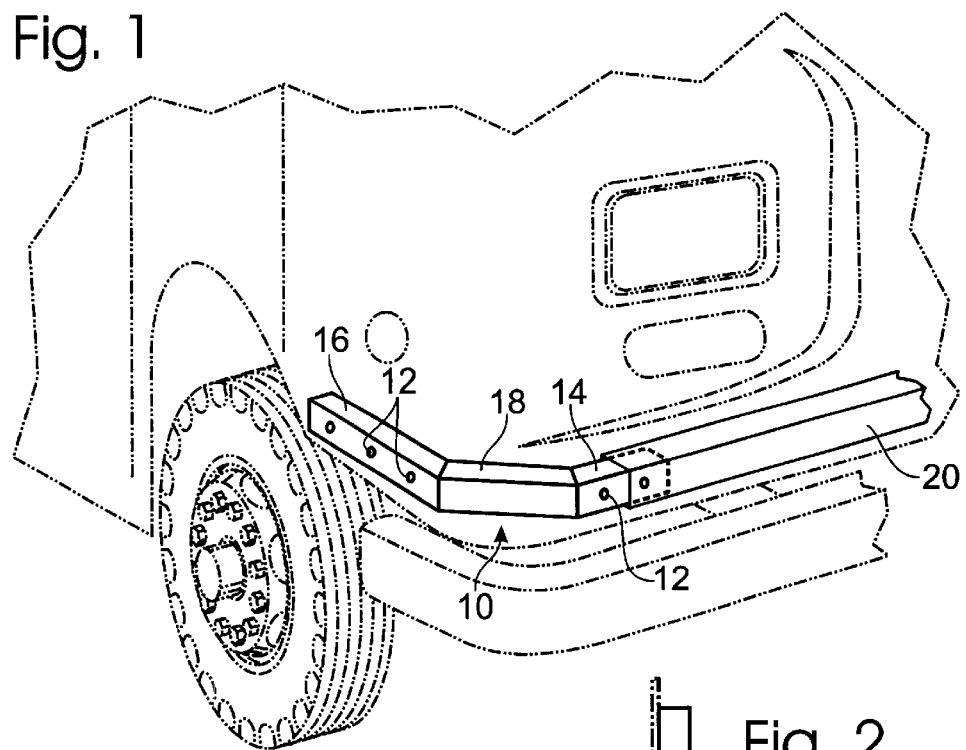
FIG. 1 shows an embodiment of the present invention mounted on a truck hood fender.
Figure 2:
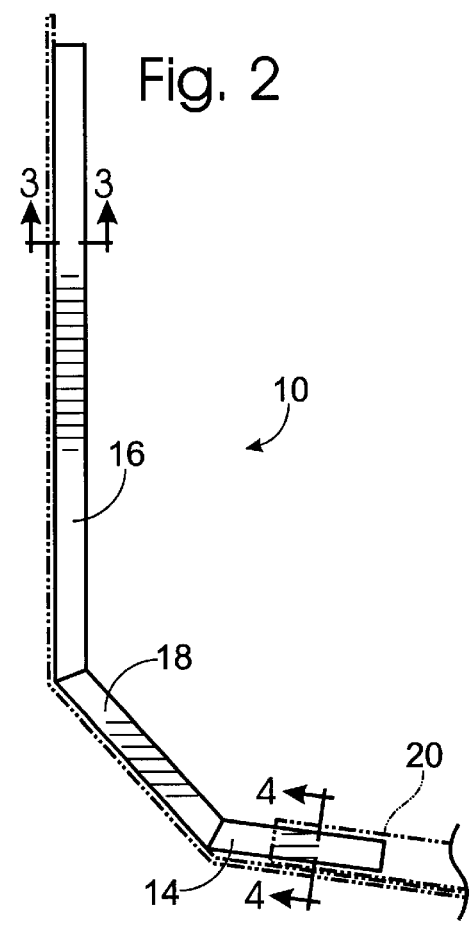
FIG. 2 shows a top down view of an embodiment of the present invention.

A lower fender extension brace is provided for mounting on trucks and vans to prevent lower fender breakage. As shown in FIG. 1, in the preferred embodiment, lower fender extension brace comprises a brace 10, and a plurality of rivets 12 for connecting said brace to the inside of a truck or van hood fender. The Brace when connected to hood fender provides structural support to the front, corner, and sides of the hood fender.

Rivets are insertable through rivet holes in said brace and connectable to a hood fender on a truck or van. Alternative and equivalent means exist for connecting said brace to a hood fender on a truck or van including the use of bolts and nuts, molecular bonding, and high strength bonding tape.

Figure 3:
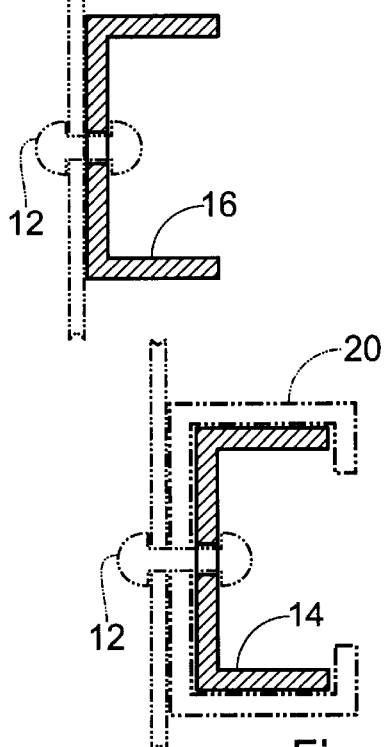
FIG. 3 shows the 3—3 view of the embodiment in FIG. 2.
Figure 4:
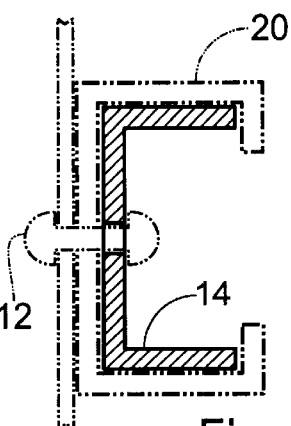
FIG. 4 shows the 4—4 view of the embodiment in FIG. 2.

Brace is made of metal channel, preferably 6063-T52 aluminum channel with a thickness of ⅛ inches. Alternatively, the brace can be made of steel or stainless steel. Brace can have a front portion 14, a side portion 16, and a connecting portion 18. Brace side, front, and connecting portions are preferably generally rectangular in appearance. In the preferred embodiment, front portion of brace is 3½ inches long, side portion is 15½ inches long, and connecting portion is 4¼ inches long. Height of front, side, and connecting portion is 1½ inches. As shown in FIGS. 3 and 4, in the preferred embodiment, the aluminum channel is a rectangular "C" shape in cross-section. The parallel ends of the rectangular "C" are each ¾ inches in length.

As shown in FIGS. 1, 3, and 4, brace is mounted on the inside of the existing fender of a motor vehicle by drilling holes through the brace and the fender, and then inserting rivets in the drilled holes. In the preferred embodiment, the lower fender extension brace attaches to rim hood fender left or right, for a Utilimaster W-700 through W-900 series type motor vehicle body, from Utilimaster Corporation, Wakarusa, Ind., to add bracing to the lower part of the fender extension. Brace is installed by removing one end rivet on a front lower metal support channel 20 that is provided on Utilimaster W-700 through W-900 series type rim hood fenders. The brace front portion 14 is slid inside of the lower metal support channel 20. The brace is then clamped to the fender to secure. Holes are drilled through the fender and the brace. The drill is preferably a $^{17}/_{64}$ inch drill bit. Three holes are drilled in the side portion, evenly spaced. As shown in FIG. 1, and FIG. 4, in the front portion, drill holes is made through existing rivet hole, where one end rivet was removed on the support channel 20. An additional drill made through front fender one inch from existing hole. Rivets are then installed, front and side.

In operation, the lower fender extension brace provides added strength and support to the lower fender, preventing it from breaking, cracking, and loss of structural integrity through such breakage and cracking.

It will of course be known that the present invention is equally applicable to motor vehicles other than trucks and vans, and the present invention is not limited the trucks and vans. Those skilled in the art will recognize that numerous modifications and changes may be made to the preferred embodiment without departing from the scope of the claimed invention. It is understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are also possible, their specific designs depending upon the particular application. As such, the scope of the invention should not be limited by the particular embodiments herein described but should be defined only by the appended claims and equivalents thereof.

We claim:

1. A lower fender extension brace, comprising:
   a. a metal brace; and
   b. means for attaching said brace to the inside of a hood fender of a truck or van;
   wherein when said brace is attached to said hood fender it provides support to the front, corner, and side of said hood fender.

2. A lower fender extension brace, comprising:
   a. a brace having a front portion, a connecting portion, and a side portion, said brace having a plurality of attachment holes provided in said brace; and
   b. a plurality of rivets insertable through said attachment holes in said brace and connectable to a hood fender of a truck or van; and
   wherein when said brace is attached to said hood fender with said rivets it provides support to the front, corner, and side of said hood fender.

3. The lower fender extension brace of claims 1 or 2, wherein the brace is made of aluminum.

4. The lower fender extension brace of claim 1, wherein said means for attaching said brace to said fender are chosen from the group consisting of rivets, nuts and bolts, molecular bonding, and high strength bonding tape.

5. A lower fender extension brace, comprising:
   a. a brace; and
   b. means for attaching said brace to the inside of a hood fender of a truck or van;
   wherein when said brace is attached to said hood fender it provides support to the front, corner, and side of the lower fender extension of said hood fender to reduce breaking and cracking in said lower fender extension.

6. The lower fender extension brace of claim 5, wherein said means for attaching said brace to said fender are chosen from the group consisting of rivets, nuts and bolts, molecular bonding, and high strength bonding tape.

7. A lower fender extension brace, comprising:
   a. a brace having a front portion, a connecting portion, and a side portion; and
   b. high strength bonding tape attachable to said brace and connecting said brace to a lower fender extension of a hood fender of a truck or van;
   wherein when said brace is attached to said hood fender it provides support to the front, corner, and side of the lower fender extension of said hood fender to reduce breaking and cracking in said lower fender extension.

* * * * *